United States Patent
Hecker et al.

(10) Patent No.: US 11,187,165 B2
(45) Date of Patent: Nov. 30, 2021

(54) METHOD FOR THE OPEN-LOOP AND CLOSED-LOOP CONTROL OF AN INTERNAL COMBUSTION ENGINE WITH A GENERATOR AND ASYNCHRONOUS MACHINE, OPEN-LOOP AND CLOSED-LOOP CONTROL UNIT, AND INTERNAL COMBUSTION ENGINE

(71) Applicant: MTU FRIEDRICHSHAFEN GMBH, Friedrichshafen (DE)

(72) Inventors: Stefan Hecker, Owingen (DE); Hendrik Weiss, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/961,871

(22) PCT Filed: Jan. 11, 2019

(86) PCT No.: PCT/EP2019/050629
§ 371 (c)(1),
(2) Date: Jul. 13, 2020

(87) PCT Pub. No.: WO2019/138034
PCT Pub. Date: Jul. 18, 2019

(65) Prior Publication Data
US 2020/0362777 A1  Nov. 19, 2020

(30) Foreign Application Priority Data
Jan. 11, 2018  (DE) .................... 10 2018 100 541.5

(51) Int. Cl.
*F02D 29/06*  (2006.01)
*F02D 41/14*  (2006.01)
(Continued)

(52) U.S. Cl.
CPC ......... *F02D 29/06* (2013.01); *F02D 41/1401* (2013.01); *F02D 31/007* (2013.01);
(Continued)

(58) Field of Classification Search
CPC .... F02D 29/06; F02D 41/1401; F02D 31/007; F02D 41/021; F02D 2041/1409;
(Continued)

(56) References Cited

U.S. PATENT DOCUMENTS 4,262,209 A * 4/1981 Berner ...................... F02G 5/02
290/7
4,498,016 A * 2/1985 Earleson ................. B60L 50/10
290/40 R
(Continued)

FOREIGN PATENT DOCUMENTS

CN   201717757 U  *  1/2011
DE   19624343 A1     1/1998

*Primary Examiner* — Sizo B Vilakazi
*Assistant Examiner* — Brian R Kirby
(74) *Attorney, Agent, or Firm* — Lucas & Mercanti, LLP; Klaus P. Stoffel

(57) ABSTRACT

A method for the open-loop and closed-loop control of an internal combustion engine, in particular a diesel engine or gas engine, with a generator and asynchronous machine, including the following steps: detecting at least one electrical characteristic variable of the generator, wherein the electrical characteristic variable is selected from current, voltage or frequency; determining a characteristic variable change in the electrical characteristic variable of the generator in a predetermined time interval; comparing the change in characteristic variable with a first threshold value; and in the event that the change in characteristic variable is greater than the first
(Continued)

threshold value, changing from a standard speed control of the internal combustion engine to a feed-forward control.

8 Claims, 4 Drawing Sheets

(51) Int. Cl.
*F02D 31/00* (2006.01)
*F02D 41/02* (2006.01)

(52) U.S. Cl.
CPC ...... *F02D 41/021* (2013.01); *F02D 2041/141* (2013.01); *F02D 2041/1409* (2013.01); *F02D 2250/18* (2013.01)

(58) Field of Classification Search
CPC ........... F02D 2041/141; F02D 2250/18; F02D 2041/1412; H02P 9/04
USPC .......................................................... 701/103
See application file for complete search history.

(56) References Cited

U.S. PATENT DOCUMENTS

| | | | | |
|---|---|---|---|---|
| 5,170,065 A * | 12/1992 | Shimizu | .................. | F02D 29/06 290/40 A |
| 5,504,417 A * | 4/1996 | Kern | ....................... | F02B 63/04 322/14 |
| 6,155,954 A * | 12/2000 | Itoyama | ................. | B60K 6/543 477/5 |
| 6,380,639 B1 * | 4/2002 | Soucy | ....................... | H02P 9/04 290/40 B |
| 6,530,359 B1 * | 3/2003 | Steffen | ..................... | H02P 9/04 123/335 |
| 7,327,047 B2 * | 2/2008 | Tsuzuki | .................. | F01D 15/10 290/52 |
| 7,481,200 B2 * | 1/2009 | Uplap | ..................... | F02D 29/06 123/352 |
| 8,115,328 B2 * | 2/2012 | Fosbinder | ............. | B23K 9/1006 290/40 C |
| 8,205,594 B2 * | 6/2012 | Fore | ........................ | F02D 29/06 123/339.18 |
| 8,683,980 B2 * | 4/2014 | Falkowski | .......... | F02D 41/1456 123/478 |
| 8,912,672 B2 * | 12/2014 | Pendray | .................... | H02P 9/04 290/41 |
| 2004/0008010 A1 * | 1/2004 | Ebrahim | .................. | H02P 9/30 322/44 |
| 2004/0102892 A1 * | 5/2004 | Aldrich, III | .......... | F02D 41/083 701/110 |
| 2005/0183700 A1 * | 8/2005 | Dolker | .................... | F02D 29/06 123/486 |
| 2005/0217640 A1 * | 10/2005 | Dolker | .................... | F02D 29/06 123/352 |
| 2008/0087480 A1 * | 4/2008 | Tarasinski | ............... | F02B 75/06 180/65.25 |
| 2009/0056354 A1 * | 3/2009 | Davis | .................... | B60H 1/3205 62/236 |
| 2009/0261599 A1 * | 10/2009 | Alston | ...................... | H02P 9/04 290/40 B |
| 2010/0106389 A1 * | 4/2010 | Fore | ........................ | F02D 29/06 701/102 |
| 2011/0028268 A1 * | 2/2011 | Kang | ..................... | B60W 10/08 477/3 |
| 2011/0139117 A1 * | 6/2011 | Kar | ....................... | F02D 11/105 123/395 |
| 2012/0139464 A1 * | 6/2012 | Filipeti | .................. | H02K 1/246 318/400.34 |
| 2014/0015257 A1 * | 1/2014 | Dobbs | ................. | F02D 41/0007 290/40 B |
| 2014/0217746 A1 * | 8/2014 | Moser | .................... | F02D 29/06 290/40 B |
| 2014/0239636 A1 * | 8/2014 | Sano | ..................... | E02F 9/2221 290/7 |
| 2015/0211512 A1 * | 7/2015 | Wiegman | ................ | F04B 23/06 417/2 |
| 2015/0311843 A1 * | 10/2015 | Iles | ........................... | H02P 9/04 290/40 B |
| 2018/0208290 A1 * | 7/2018 | Biebach | ................. | B60L 50/10 |
| 2018/0283294 A1 * | 10/2018 | Matsuyama | .......... | B60W 10/06 |

\* cited by examiner

METHOD FOR THE OPEN-LOOP AND CLOSED-LOOP CONTROL OF AN INTERNAL COMBUSTION ENGINE WITH A GENERATOR AND ASYNCHRONOUS MACHINE, OPEN-LOOP AND CLOSED-LOOP CONTROL UNIT, AND INTERNAL COMBUSTION ENGINE

CROSS-REFERENCE TO RELATED APPLICATIONS

The present application is a 371 of International application PCT/EP2019/050629, filed Jan. 11, 2019, which claims priority of DE 10 2018 100 541.5, filed Jan. 11, 2018, the priority of these applications is hereby claimed and these applications are incorporated herein by reference.

BACKGROUND OF THE INVENTION

The invention relates to a method for open and closed-loop control of an internal combustion engine having a generator and an asynchronous machine, to an open and closed-loop control device for an internal combustion engine having a generator and an asynchronous machine, and to an internal combustion engine having a generator and an asynchronous machine.

In the design and in the operation of internal combustion engines such as combustion engines having a generator, asynchronous machines are often used as load motors for various applications, for example as prime movers for fans, pumps and lifting gear. Asynchronous motors are one of the most common electric machines, since they are easy and cost effective to produce. Their design means that in activating asynchronous machines high starting currents occur, up to eight times the rated current. These high starting currents cause a brief surge in the power output, leading to a distinct drop in the speed, for example, of the combustion engine equipped with a synchronous generator. The combustion engine speed control must then react to this sudden drop. On the drive technology market there are already various components which minimize these problems of high starting currents, such as star-delta starters, soft starters and converters. The method most commonly used is the star-delta connection. When starting in a star connection the power and torque are reduced to approximately one third. After the run-up period a reversal of the contactors produces a switch to delta connection mode. With suitable configuration and programming, frequency converters are capable of gently running up asynchronous motors commensurate with the load. In safety-critical applications, however, direct starting of asynchronous motors is still desirable, in order to reduce the likelihood of failure by reducing the number of components and also to minimize the number of costly power-electronic components. At the same time, the aim is to avoid a sudden drop in the combustion engine speed.

SUMMARY OF THE INVENTION

According to a first aspect of the invention this object is achieved by a method for open and closed-loop control of an internal combustion engine, in particular a diesel engine or gas engine, having a generator and asynchronous machine, which comprises:

sensing of at least one electrical parameter of the generator, the electrical parameter being selected from the current, the voltage or the frequency, determination of a parameter change of the electrical parameter of the generator at a predefined time interval, comparison of the parameter change with a first limit change-over from a standard speed control of the internal combustion engine to a pre-control should the parameter change be greater than the first limit.

The invention embraces the finding that by detecting an initial current surge when starting up the asynchronous machine and subsequently changing over from the standard speed control to a pre-control, the asynchronous machine starting process can be absorbed by the internal combustion engine without at first leading to a drop in the speed of the internal combustion engine. The pre-control renders additional power-electronic components obsolete and allows direct starting of the asynchronous machine. It is therefore possible to react predictively to an additional load on the engine and there is no need to wait first for a drop in the speed before counter-measures are initiated. In the case of a conventional addition to the load a torque is impressed by the electrical load. This torque causes braking of the combustion engine and the speed of the combustion engine therefore drops. Only now can the addition to the load be reliably detected and a counter-measure initiated. To do this, the quantity of fuel is increased as a function of the drop in speed and an attempt made to accelerate the engine back up to the predetermined set speed.

This configuration of the speed control means that in the prior art it is necessary to wait for a reaction on the part of the internal combustion engine-generator system as a whole. Counter-measures can be initiated only once the speed has dropped. The method according to the invention renders such waiting obsolete; by detecting the initial current surge via the parameter change at a predefined time interval, the addition to the load can be detected precisely and immediate counter-measures can be initiated via the pre-control. The load switching capability of the overall system can therefore be improved. Furthermore, with the aid of the invention it is possible to avoid pronounced speed fluctuations. In addition, within limits it is possible to impose larger loads. Moreover, rapid prediction of the load means that the units no longer have to be so over-dimensioned. This leads to a cost saving and smaller overall design space. The unit also runs in more favourable operating ranges due to a better utilization of capacity.

Advantageous developments of the method are described below. The additional features of the exemplary embodiments may be combined with one another to form further developments, unless they are expressly described in the description as being alternatives to one another.

The pre-control preferably comprises the determination of an adjusted set fuel injection quantity. The adjusted set fuel injection quantity may be selected from filed set fuel injection quantities. The adjusted set fuel injection quantity is preferably determined on the basis of a measurement of the parameter change. From the measurement of the parameter change it is possible, for example via a predictive algorithm, to estimate the rated capacity of the asynchronous machine, that is to say the load. With this information it is then possible to estimate the impending load for the combustion engine and to determine an adjusted set fuel injection quantity. From the adjusted set fuel injection quantity, it is therefore possible to optimize the speed control of the combustion engine. The parameter change may be determined as a gradient of a characteristic curve over time.

It is preferable here if the adjusted set fuel injection quantity increases the greater the parameter change. Furthermore, the adjusted set fuel injection quantity is advantageously determined taking into account a measured maximum starting current of the asynchronous machine. The maximum starting current allows a further improvement in the estimate of the rated capacity of the asynchronous machine and thereby an improved starting performance of the overall system comprising the internal combustion engine, the generator and the asynchronous machine. The pre-control may furthermore provide additional measures for improving the load switching capability, such as a brief voltage reduction on the generator.

It is advantageous if the method further comprises:
renewed determination of the parameter change
comparison of the parameter change with a second limit, which is less than the first limit
return from the pre-control to the standard speed control, should the parameter change be less than the second lim.

These additional steps serve to establish whether the start-up phase of the asynchronous machine is completed, by verifying whether the parameter change has fallen to a correspondingly low measurement below the second limit and secondly, if this is the case, whether the standard speed control is re-activated. If the parameter change is still greater than the second limit, the pre-control remains active.

In one development the standard speed control comprises a continuous determination of a standard set fuel injection quantity based on a comparison between the set speed and the actual speed of the internal combustion engine.

According to a second aspect the invention relates to an open and closed-loop control device for an internal combustion engine having a generator and an asynchronous machine, which is designed to perform a method according to the first aspect of the invention.

It is particularly preferable if the open and closed-loop control device comprises a speed governor and a system control, the speed governor being designed to perform the standard speed control and the system control being designed to perform the pre-control, and the open and closed-loop control device being designed to cause a change-over from a dominance of the speed governor to a dominance of the system control should the parameter deviation or the parameter change be greater than the first limit.

According to a third aspect the invention relates to an internal combustion engine, in particular a diesel engine or a gas engine, having a generator and an asynchronous machine comprising an open and closed-loop control device according to the second aspect of the invention.

The open and closed-loop control device according to the second aspect and the internal combustion engine having a generator and an asynchronous machine share the advantages of the method for open and closed-loop control according to the first aspect of the invention.

Exemplary embodiments of the invention are now described below referring to the drawing. This is not necessarily intended to represent the exemplary embodiments true to scale, the drawing instead being in schematic and/or slightly distorted form where this serves for the purposes of explanation. For amplification of the teachings directly perceivable from the drawing, reference is made to the relevant prior art. It should be borne in mind here that a many different modifications and changes may be made to the form and detail of an exemplary embodiment without departing from the general idea of the invention. The features of the invention disclosed in the description, in the drawing and in the claims may be essential for the development of the invention both individually and in any combination. Moreover, all combinations of at least two of the features disclosed in the description, the drawing and/or the claims come within the scope of the invention. The general idea of the invention is not limited to the precise form or the detail of the preferred exemplary embodiments shown and described below, or limited to a subject matter that would be limited in comparison to the subject matter claimed in the claims. In the case of specified ranges of measurements, values lying within the stated limits shall also be disclosed as limits and are to be freely useable and claimable. For the sake of simplicity, the same reference symbols are used below for identical or similar parts or parts performing an identical or similar function.

BRIEF DESCRIPTION OF THE DRAWING

Further advantages, features and details of the invention emerge from the following description of the preferred exemplary embodiments and by referring to the drawing, in which.

DETAILED DESCRIPTION OF THE INVENTION

Figure 1:
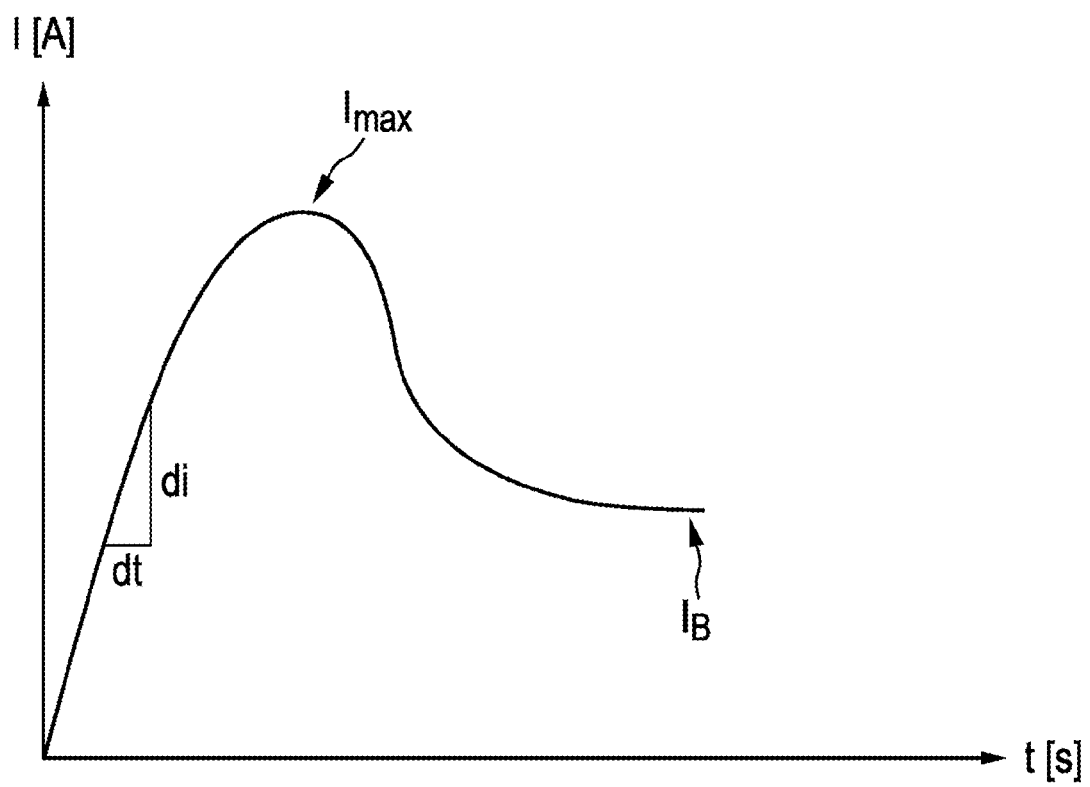
FIG. 1 in a schematic representation shows an example of a curve of a starting current of an asynchronous machine over time.

FIG. 1 by way of example represents a curve of a starting current of an asynchronous machine over time. The starting current I here rises sharply up to a maximum starting current Imax and then falls to an operating level IB, at which the asynchronous machine functions after the starting phase. The sharp rise in the current curve at the beginning of the starting phase is expressed in the gradient di/dt, that is to say the parameter change at a specific time interval. According to the invention this rise is detected as an electrical parameter change, and if the parameter change exceeds a first limit a change-over is performed from a standard speed control of an internal combustion engine connected to the asynchronous machine to a pre-control. Here, as an element in the pre-control, a set fuel injection quantity is determined for the internal combustion engine. This may be done from predetermined values or on the basis of a measurement of the parameter change. Besides the current, the voltage and frequency can also be considered as electrical parameters.

Figure 2:
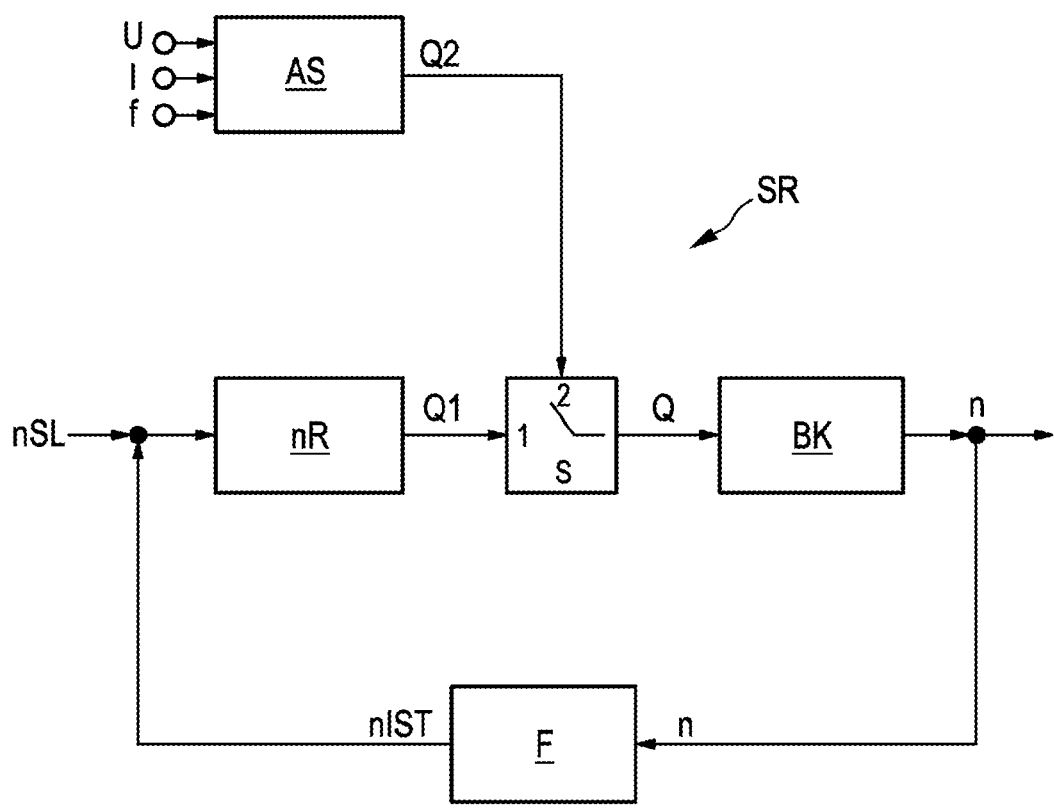
FIG. 2 in a schematic representation shows an exemplary embodiment of an open and closed-loop control device according to the second aspect of the invention.

FIG. 2 shows a schematic representation of an exemplary embodiment of an open and closed-loop control device SR for an internal combustion engine BK having a generator and an asynchronous machine, comprising a speed governor nR and a system control AS. The speed governor nR here is designed to perform a standard speed control, which comprises a continuous determination of a standard set fuel injection quantity Q1 based on a comparison between a set speed nSL and an actual speed nIST of the internal combustion engine BK. In the exemplary embodiment shown a filter F is additionally used to determine the actual speed nIST from a registered speed n. The open and closed-loop control device SR is designed to sense at least one electrical parameter of the generator, the electrical parameter being selected from the current I, the voltage U or the frequency f, and to determine a parameter change dI/dt, dU/dt, df/dt of the electrical parameter of the generator at a predefined time interval. The open and closed-loop control device is furthermore designed to compare the parameter change dI/dt, dU/dt, df/dt with a first limit and to cause a change-over from a dominance of the speed governor nR to a dominance of the system control AS, should the parameter deviation or the parameter change be greater than the first limit. The system control AS is designed to perform a pre-control. In the exemplary embodiment shown the pre-control comprises the determination of an adjusted set fuel injection quantity Q2 based on a measurement of the parameter change, the adjusted set fuel injection quantity increasing the greater the parameter change. The open and closed-loop control device SR is further designed, after renewed determination of the parameter change, to compare the parameter change with a second limit, which is less than the first limit, and to cause a return from the pre-control to the standard speed control, should the parameter change be less than the second limit. In the exemplary embodiment shown the change-over from the pre-control to the standard speed control and vice-versa is represented by a change in a switch position of the switch from 2 to 1 or 1 to 2. A set fuel injection quantity Q delivered to the internal combustion engine BK is therefore either the adjusted set fuel injection quantity Q2 or the standard set fuel injection quantity Q1, depending on the dominance.

Figure 3:
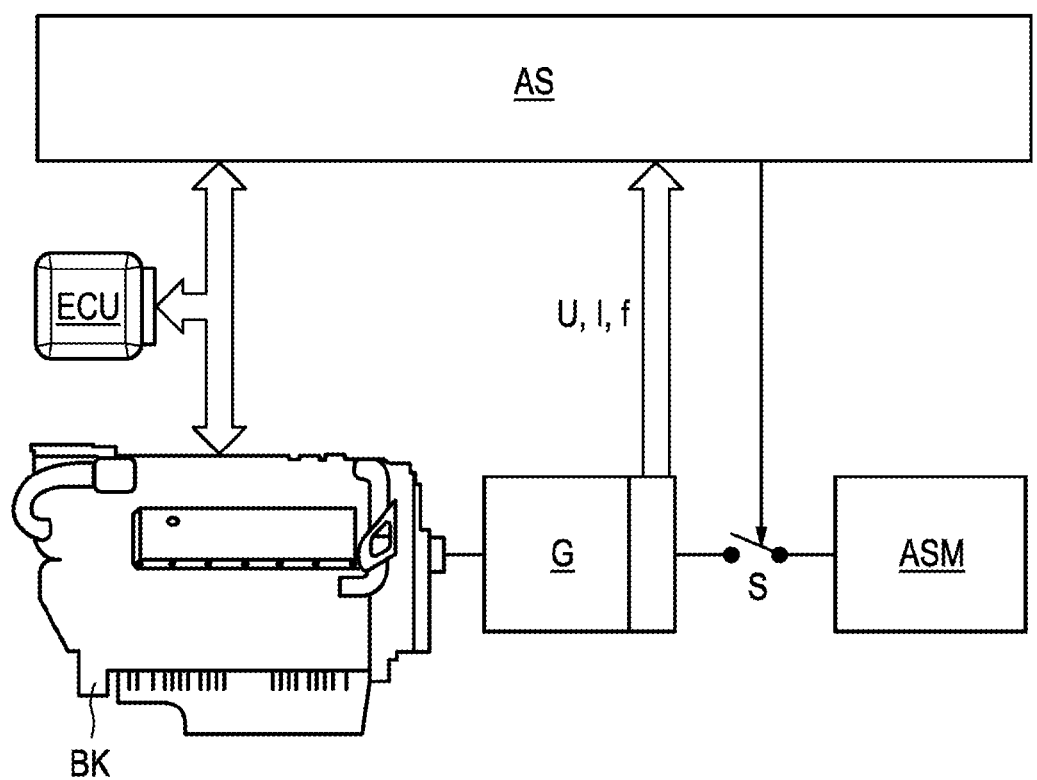
FIG. 3 in a schematic representation shows an exemplary embodiment of an internal combustion engine having a generator and an asynchronous machine according to the third aspect of the invention.

FIG. 3 shows a schematic representation of an exemplary embodiment of an internal combustion engine BK having a generator G and an asynchronous machine ASM. The internal combustion engine BK further comprises an open and closed-loop control device, which comprises a speed governor and a system control AS. The speed governor here is part of the engine control unit ECU. At least one electrical parameter of the generator G selected from the current I, the voltage U and the frequency f is sensed by the system control AS and an associated parameter change is determined at a predefined time interval. The open and closed-loop control device compares the parameter change with a first limit, and if the parameter change is greater than the first limit the open and closed-loop control device causes a change-over from a standard speed control of the internal combustion engine by the speed governor to a pre-control by the system control. In the exemplary embodiment shown the system control AS is furthermore designed to activate the asynchronous machine via a switch S.

Figure 4:
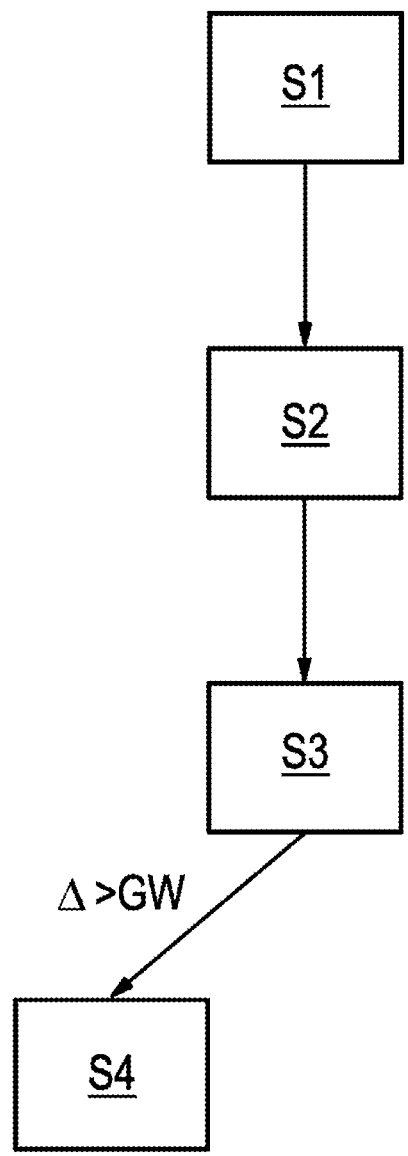
FIG. 4 in a schematic representation shows a method for open and closed-loop control of an internal combustion engine having a generator and an asynchronous machine.

FIG. 4 shows a schematic representation of a method for the open and closed-loop control of an internal combustion engine having a generator and an asynchronous machine. At least one electrical parameter of the generator selected from the current, the voltage and the frequency is sensed in step S1 and an associated parameter change Δ is determined at a predefined time interval in step S2. In step S3 the parameter change Δ is compared with a first limit and, if the parameter change Δ is greater than the first limit GW1, in step S4 a change-over ensues from a standard speed control of the internal combustion engine to a pre-control. In the exemplary embodiment shown the pre-control comprises the determination of an adjusted set fuel injection quantity based on a measurement of the parameter change, the adjusted set fuel injection quantity increasing the greater the parameter change.

LIST OF REFERENCE NUMERALS

I starting current
Imax maximum starting current
IB operating level
SR open and closed-loop control device
BK internal combustion engine
G generator
ASM asynchronous machine
nR speed governor
AS system control
Q1 standard set fuel injection quantity
nSL set speed
nIST actual speed
n registered speed
Q2 adjusted set fuel injection quantity
Q set fuel injection quantity
F filter
S switch
GW1 first limit
Δ parameter change

The invention claimed is:

1. A method for open and closed-loop control of an internal combustion engine having an open and closed-loop control device, a generator and an asynchronous machine, wherein the asynchronous machine is engaged via a switch, the method comprising the steps of:
   sensing at least one electrical parameter of the generator, the electrical parameter being selected from current or voltage;
   determining a parameter change of the electrical parameter of the generator at a predefined time interval;
   comparing the parameter change with a first limit;
   changing-over from a standard speed control to a pre-control of the open and closed-loop control device of the internal combustion engine when the parameter change is greater than the first limit,
   wherein the standard speed control includes a continuous determination of a standard set fuel injection quantity based on a comparison between a set speed and actual speed of the internal combustion engine, and the pre-control includes determining an adjusted set fuel injection quantity based on a measurement of the parameter change, and a renewed determination of the parameter change;
   comparing the parameter change with a second limit, which is less than the first limit; and
   returning from the pre-control to the standard speed control when the parameter change is less than the second limit.

2. The method according to claim 1, wherein the adjusted set fuel injection quantity increases as the parameter change becomes greater.

3. The method according to claim 1, including determining the adjusted set fuel injection quantity taking into account a measured maximum starting current of the asynchronous machine.

4. An internal combustion engine, comprising: a generator; a switchable asynchronous machine; and an open and closed-loop control device configured to carry out the method according to claim 1, the control device including a speed governor and a system control, the speed governor being configured to perform a standard speed control and the system control being configured to perform a pre-control and being configured to switch on the asynchronous machine via a switch.

5. The internal combustion engine according to claim 4, wherein the engine is a diesel engine or a gas engine.

6. The method according to claim 1, including detecting a first current surge when starting the asynchronous machine so that a direct start of the asynchronous machine is possible.

7. The method according to claim 6, wherein the detection of the first current surge takes place via the parameter change in the predetermined time interval.

8. The method according to claim 1, wherein the parameter change comprises a gradient of current or voltage in the predetermined time interval.

* * * * *